(12) United States Patent
Bacha et al.

(10) Patent No.: US 8,684,665 B2
(45) Date of Patent: Apr. 1, 2014

(54) RING SECTOR OF TURBOMACHINE TURBINE

(75) Inventors: Jean-Luc Bacha, Paris (FR); Emmanuel Berche, Vernou (FR); Didier Jeannel, Paris (FR)

(73) Assignee: SNECMA, Paris (FR)

( * ) Notice: Subject to any disclaimer, the term of this patent is extended or adjusted under 35 U.S.C. 154(b) by 561 days.

(21) Appl. No.: 13/018,789

(22) Filed: Feb. 1, 2011

(65) Prior Publication Data

US 2011/0188993 A1    Aug. 4, 2011

(30) Foreign Application Priority Data

Feb. 2, 2010   (FR) ...................................... 10 50710

(51) Int. Cl.
*F01D 5/14*   (2006.01)

(52) U.S. Cl.
USPC .......................................... 415/115; 415/116

(58) Field of Classification Search
USPC ........ 415/116, 173.1, 173.2, 173.3, 175, 176, 415/177, 178, 115
See application file for complete search history.

(56) References Cited

U.S. PATENT DOCUMENTS

| | | | | |
|---|---|---|---|---|
| 5,165,847 A | * | 11/1992 | Proctor et al. | 415/115 |
| 5,964,575 A | * | 10/1999 | Marey | 415/115 |
| 6,530,223 B1 | * | 3/2003 | Dodds et al. | 60/746 |
| 7,008,183 B2 | * | 3/2006 | Sayegh et al. | 415/173.1 |
| 2003/0131980 A1 | * | 7/2003 | DeMarche et al. | 165/169 |
| 2004/0047725 A1 | * | 3/2004 | Tomita et al. | 415/116 |
| 2004/0258517 A1 | * | 12/2004 | Naik et al. | 415/116 |
| 2008/0101923 A1 | * | 5/2008 | Botrel et al. | 415/173.1 |

FOREIGN PATENT DOCUMENTS

EP    1 918 526 A1    5/2008

OTHER PUBLICATIONS

U.S. Appl. No. 13/311,094, filed Dec. 5, 2011, Bacha, et al.
French Preliminary Search Report issued May 11, 2010, in French 1050710, filed Feb. 2, 2010 (with English Translation of Category of Cited Documents).

* cited by examiner

*Primary Examiner* — Nathaniel Wiehe
*Assistant Examiner* — Michael Sehn
(74) *Attorney, Agent, or Firm* — Oblon, Spivak, McClelland, Maier & Neustadt, L.L.P.

(57) ABSTRACT

A turbine ring sector comprising a wall presenting an inside face and an outside face, in which the inside face defines an axially oriented airflow passage through which gas flows; and a multiply-perforated metal sheet situated on the side of the wall that is opposite from the airflow passage is disclosed. The multiply-perforated metal sheet has a bottom, and the space between the outside face of the wall and the bottom of the multiply-perforated metal sheet defines a gap. The variation in the value of the gap over the entire axial extent thereof decreases from a first maximum value towards a minimum value and then increases from the minimum value to a second maximum value.

11 Claims, 3 Drawing Sheets

RING SECTOR OF TURBOMACHINE TURBINE

FIELD OF THE INVENTION

The invention relates to the field of turbomachines, and more particularly to cooling ring sectors in a turbomachine turbine. It applies to any type of turbomachine, for land or aviation use, and in particular to turboprops or turbojets for airplanes.

An aviation turbomachine conventionally comprises a compressor, a combustion chamber, and a turbine. The role of the turbine is to drive the compressor in rotation, extracting some of the pressure energy from the hot gas that leaves the combustion chamber and transforming it into mechanical energy.

The turbine, situated downstream from the combustion chamber, is the member of the turbomachine that operates under the most severe conditions. In particular, it is subjected to high levels of thermal and mechanical stress generated by the hot gas leaving the combustion chamber.

Conventionally, a turbine includes at least one nozzle, constituted by a row of vanes that are stationary relative to the casing of the turbomachine, and at least one rotor wheel comprising a set of rotor blades suitable for being set into the rotation.

A rotor wheel is surrounded by a stationary ring that is secured to the casing. A particular function of the ring is for its inside surface to reconstitute the outer boundary of the airflow passage. Usually, this ring is built up from a plurality of sectors. Because it is permanently exposed to hot gas, a turbine ring presents a lifetime that is short. It is therefore necessary to cool it in order to give it good high-temperature performance.

BACKGROUND OF THE INVENTION

One known cooling solution consists in providing the turbine ring with multiply-perforated metal sheets that surround said ring. A solution of that type is described, for example in document EP 0 893 577. FIG. 1 shows an example of a ring sector analogous to that described in document EP 0 893 577, in which a turbine ring sector 6 has a wall 5 defining an airflow passage that is axially oriented along the axis X along which the gas flows. A multiply-perforated metal sheet 1 is situated on the side of the wall 5 that is opposite from the airflow passage. Said multiply-perforated metal sheet 1 comprises a bottom 2 and side walls 3. The (empty) space between the wall 5 of the ring sector 6 and the bottom 2 of the multiply-perforated metal sheet 1 defines a gap E.

In such a system, the axial direction is defined by the axis of rotation of the rotor blades. A radial direction is defined by a radius of a disk perpendicular to the axis of rotation of the rotor blades and centered on said axis. The circumferential direction is the direction that is tangential to the tips of the rotor blades when they are in rotation. These three directions (axial, radial, and circumferential) define a system of axes of the cylindrical type. Furthermore, in this example, "upstream" and "downstream" are defined relative to the flow direction (from upstream to downstream) of cooling gas through the multiply-perforated metal sheet 1 (flow that is directed towards the wall 5 of the ring sector 6).

In this prior art example, the gap E is constant. Perforations 4 are distributed over the bottom 2 of the multiply-perforated metal sheet 1. The perforations that are situated in the bottom 2 in its center, in the axial direction, are referenced 4C0 on the outside (their immediate neighbors in the axial direction) are referenced 4C1. The perforations bordering the perforations 4C1 on the outside (their outer immediate neighbors in the axial direction) are referenced 4C2, etc.

FIG. 1A is a diagram showing the air streams through the FIG. 1 ring sector. Cooling gas passes through the metal sheet 1 via the perforations 4 in the form of a radial stream of gas, and impacts the wall 5 of the ring sector 6 in order to cool it. After impacting the wall 5, the gas is deflected towards the sides C of the wall 5. Thus, the radial stream F0 of gas that passes through the central perforations 4C0 gives rise to a stream f0 that is oriented in the axial direction. This axial stream f0 of gas (deflected radial stream F0) shears the radial stream F1 of gas leaving the perforations 4C1. The efficiency of the impact cooling due (solely) to the radial stream F1 of gas coming from the perforations 4C1 is thus reduced. In the same manner, the radial stream F1 of gas coming from the perforations 4C1 is deflected in the axial direction by the wall 5, and gives rise to an axial stream f1 that adds to the axial stream f0 of gas (deflected radial stream F0) coming from the perforations 4C0, and shears the radial stream F2 of gas coming from the perforations 4C2, and so on. Thus, the radial stream Fn (where n is an integer greater than or equal to 1) of gas coming from a peripheral perforation 4Cn impacting the wall 5 is sheared by the axial stream of gas resulting from the wall 5 deflecting the radial streams F0, F1, ..., Fn−1 coming from the perforations situated closer to the center 4C0, 4C1, ..., 4Cn−1. The overall efficiency of the cooling of the wall 5 by impact is thus reduced on going away from the center of the bottom 2 of the metal sheet 1. The cooling of the ring sector is thus not uniform, the ring sector 6 being better cooled in its central region than at its periphery (in the axial direction).

OBJECT AND SUMMARY OF THE INVENTION

An object of the present invention is to propose a solution to this problem of non-uniform cooling of the ring sector.

In order to achieve this object, the invention provides a turbine ring sector comprising a wall presenting an inside face and an outside face, the inside face defining an axially oriented airflow passage through which gas flows; and a multiply-perforated metal sheet situated on the side of the wall that is opposite from the airflow passage, said multiply-perforated metal sheet having a bottom; wherein the space between the outside face of the wall and the bottom of the multiply-perforated metal sheet defines a gap; and wherein the variation in the value of the gap over the entire axial or circumferential extent thereof decreases from a first maximum value towards a minimum value, said minimum value defining the minimum of the gap, and then increases from the minimum value to a second maximum value.

It can thus be understood that in the axial (or circumferential) direction, the value of the gap varies (i.e. it is not constant). The value of the gap corresponds to the minimum distance between the bottom and the wall, at any given point. Thus, over the entire axial (or circumferential) extent of the gap, the gap presents a minimum value that corresponds to the minimum of the gap. This minimum of the gap is spaced apart from the axial (or circumferential) ends of the bottom of the multiply-perforated metal sheet. Thus, the value of the gap varies so that it increases on either side of the minimum of the gap up to the first maximum value on one side and up to the second maximum value on the other. The gap presents the first and second maximum values in the vicinity of the axial (or circumferential) ends of the bottom of the multiply-perforated metal sheet.

Thus, in one embodiment, it can be understood that, starting from a given point on the ring sector, the value of the gap is substantially constant along the circumferential direction while it varies along the axial direction. This embodiment is particularly well adapted to circumstances in which the gas stream delivery outlets are arranged in the axial direction. In another embodiment, it can be understood that, starting from a given point on the ring sector, the value of the gap is substantially constant in the axial direction, while it varies in the circumferential direction. This embodiment is particularly well adapted to circumstances in which the gas stream delivery outlets are disposed in the circumferential direction.

Thus, since the value of the gap increases from the gap minimum towards the gap maximum (in the axial or circumferential direction), all way to said axial (or circumferential) ends of the bottom, the axial (or circumferential) streams that result from the deflection of the radial streams are subjected to a pressure drop (or expansion) while they flow. The axial (or circumferential) streams thus have their flow speeds reduced and they do not shear the radial streams coming from the adjacent perforations. Consequently, the cooling by impact retains its efficiency over all of the ring sector.

It should be observed that the distribution of the perforations of the device of the invention may be uniform or non-uniform. Thus, the distribution of the perforations may be adapted to the distribution of the hot zones of the ring sector, so as to provide cooling thereof that is uniform. Furthermore, depending on the distribution of the perforations, it is possible to achieve cooling that is preferentially by impact in certain zones of the ring sector and cooling that is preferentially by convection in other zones. Cooling by convection is cooling that is performed mainly by the axial streams.

Advantageously, in the axial direction, the outside face of the wall is plane, while the bottom of the multiply-perforated metal sheet presents a shape that is convex.

A wall and a multiply-perforated metal sheet presenting such shapes present the advantage of being easy to fabricate, and thus of presenting a fabrication cost that is moderate or even small. It can be understood that the convex side of the bottom is placed facing the outside face of the wall. In other words, the peak of the "bulge" corresponding to the convex shape of the bottom is disposed facing the wall. Thus, the minimum of the gap is defined by the peak of this "bulge".

Advantageously, the minimum of the gap is disposed in register with a hot zone of the wall.

The term "hot zone of the wall" is used to mean a zone of the wall that is hotter than other zones of the wall. Thus, by placing the minimum of the gap in register with a hot zone, cooling by impact, which is the most efficient since it comes from the perforations that are closest to the wall, is concentrated on this hot zone. This improves the overall cooling of the ring sector, in particular by providing uniform cooling over all of the ring sector, by giving preferential cooling to the hot zone.

Preferably, the multiply-perforated metal sheet presents at least one perforation at the minimum of the gap.

Thus, where the gap presents its minimum value in the axial direction, the multiply-perforated metal sheet presents a perforation. This makes it possible to improve impact cooling by positioning the perforation so that it is as close as possible to the wall.

Advantageously, a middle zone extends around the minimum of the gap, the multiply-perforated metal sheet presenting more perforations in the middle zone than in the zones located on either side of the middle zone.

A middle zone is defined as being a limited zone that extends around the gap minimum in the axial direction. For example, the middle zone corresponds to a zone where the gap lies between its minimum value Emin and its minimum value Emin plus 10 percent (10%) of the difference between the smaller of the two maximum values Emax1 and Emax2 and the minimum value Emin. In other words, in this example, the middle zone is defined as being the zone in which the value of the gap lies between Emin and (Emin+0.1×(min(Emax1,Emax2)−Emin)). It should be observed that "min(,)" corresponds to the operator for selecting the minimum value among two or more values.

Two lateral zones are also defined as being the two zones located on either side of the middle zone. For example, these two lateral zones correspond to the zones where the value of the gap lies in the range (Emin+0.1×(min(Emax1,Emax2)−Emin)) to Emax1 on one side, and in the range (Emin+0.1×(min(Emax1,Emax2)−Emin)) to Emax2 on the other side.

Thus, the middle zone presents more perforations than the zones located on either side (i.e. the lateral zones), with cooling by impact being enhanced in the middle zone, while cooling in the lateral zones is performed for the most part by convection. This makes it possible to ensure great uniformity of cooling for the ring sector by combining cooling by impact with cooling by convection. Furthermore, since the lateral zones are cooled mainly by convection, any shear of a radial impact cooling stream in a lateral zone has little influence on the overall efficiency of the cooling. This contributes to ensuring that cooling is uniform and efficient.

The invention also provides a turbine ring including at least one ring sector of the invention, a turbine including such a ring, and a turbomachine including such a turbine.

BRIEF DESCRIPTION OF THE DRAWINGS

The invention and its advantages can be better understood on reading the following detailed description of various embodiments given as nonlimiting examples. The description makes reference to the sheets of the accompanying drawings, in which.

MORE DETAILED DESCRIPTION

Figure 1:
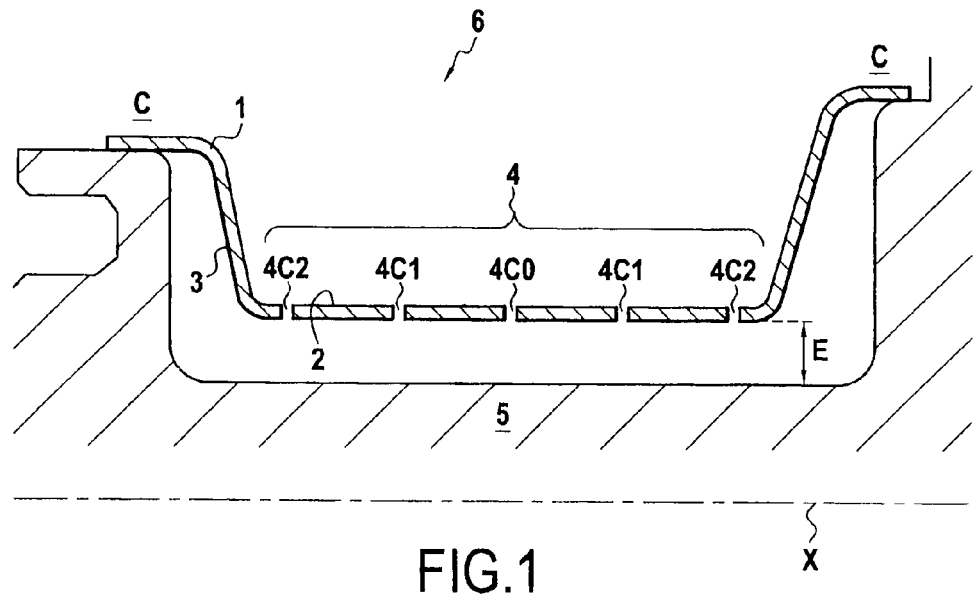
FIG. 1 is an axial section view of a ring sector of the prior art.
Figure 1A:
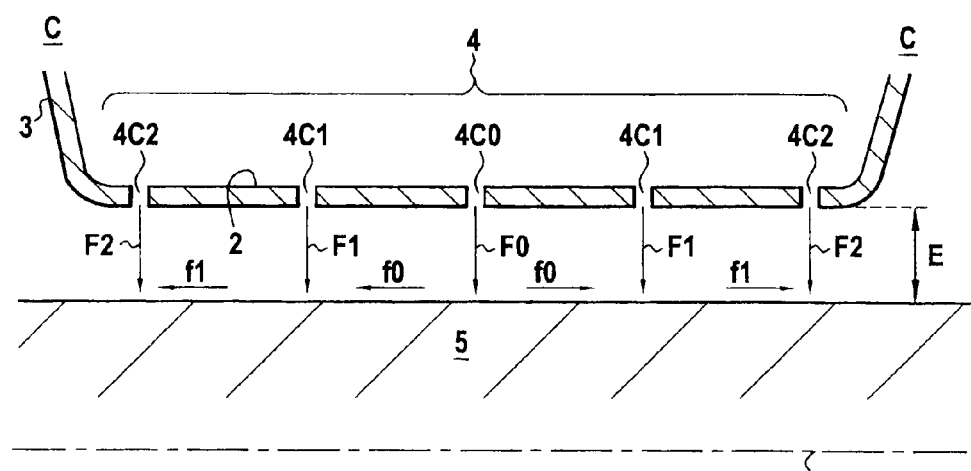
FIG. 1A is a diagram showing the gas streams in the ring sector of FIG. 1.

A first embodiment of the invention is described with reference to FIG. 2. In this example, a turbine ring sector 16 comprises a wall 15 having its inside face 15b defining an airflow passage oriented along the axial direction X and along which gas flows, together with a multiply-perforated metal sheet 11 situated outside the wall 15, i.e. opposite from the airflow passage relative to the wall 15. Said multiply-perforated metal sheet 11 has a bottom 12 of shape that is convex towards the axial direction X, the bottom being directly connected to fastener tabs 11' for fastening the metal sheet 11 to the rims 17. The outside face 15a of the wall 15 is plane in the axial direction X. This outside face 15a naturally presents a shape that is annular in the circumferential direction. The convex side of the bottom 12 is oriented towards the wall 15, facing the face 15a.

The (empty) space between the wall 15 of the ring sector 16 and the bottom 12 of the multiply-perforated metal sheet 11 defines a gap E. The value of the gap E, corresponding to the minimum distance measured between the wall 15 and the bottom 12, varies in the axial direction X and over the entire axial extent of the bottom 12 in decreasing manner from a first maximum value Emax1 towards a minimum value Emin, and then in increasing manner from the minimum value Emin to a second maximum value Emax2. This variation can be seen in FIG. 2 by scanning it from left to right. The first axial end 12*a* of the bottom 12 defines a first maximum of the gap corresponding to the first maximum value Emax1, while the second radial end 12*b* of the bottom 12 defines a second maximum of the gap corresponding to the second maximum value Emax2.

The perforations 14 of the multiply-perforated metal sheet are regularly spaced apart over the bottom 12 in the axial direction. Among the perforations 14, one perforation is located at the minimum of the gap, corresponding to the minimum value Emin, this perforation being numbered 14*c*.

A middle zone I extends around the minimum of the gap. Two lateral zones II and III extend on either side of the middle zone I. The lateral zone II extends axially from the end 12*a* of the bottom 12, where the gap E presents its maximum value Emax1, as far as the boundary of the middle zone I. The lateral zone III extends axially from the end 12*b* of the bottom 12, where the gap E presents its maximum value Emax2, as far as the boundary of the middle zone I. In the section shown in FIG. 2, the middle zone I has three perforations 14, the lateral zone II presents only one perforation 14, and the lateral zone III presents three perforations 14. The perforation 14*c* located at the level of the minimum of the gap is substantially in the middle, in the axial direction, of the middle zone I. Consequently, this perforation 14*c* is referred to as the "central perforation".

Figure 2:
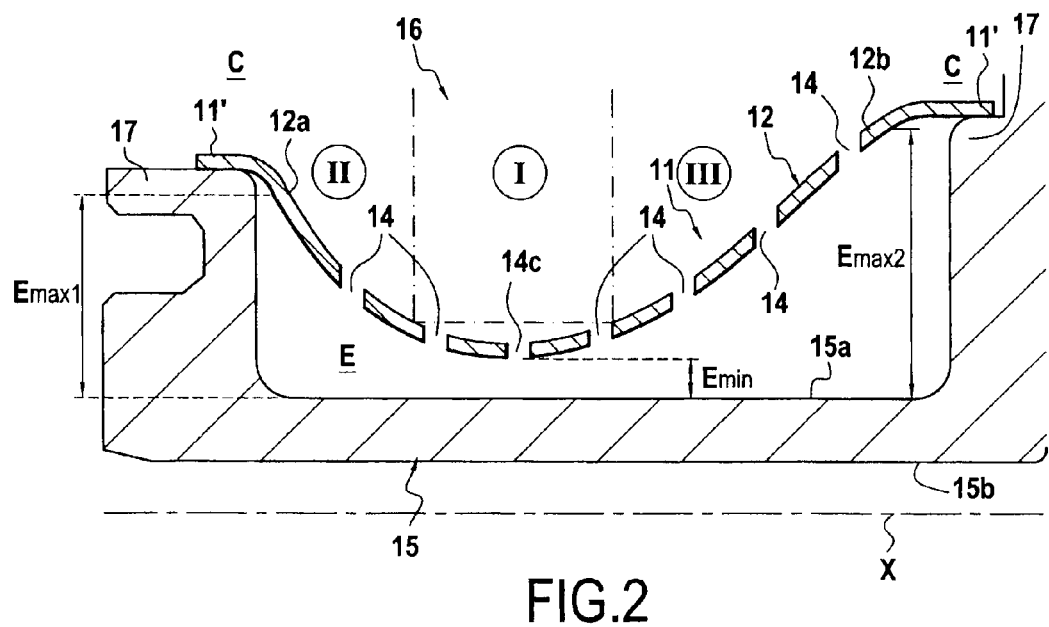
FIG. 2 is an axial section view of a first embodiment of a ring sector of the invention.
Figure 2A:
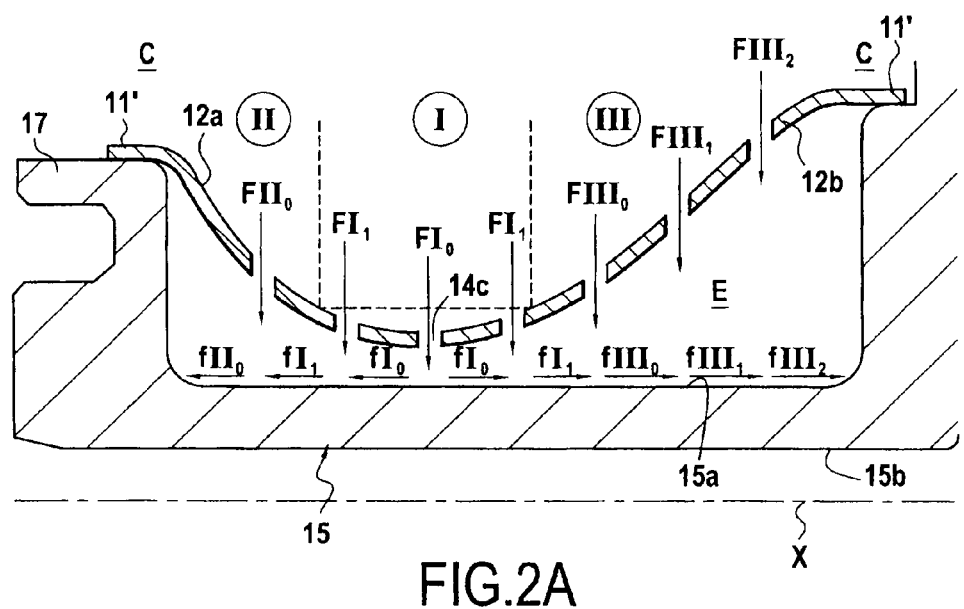
FIG. 2A is a diagram of the gas streams in the ring sector of FIG. 2.

FIG. 2A is a diagrammatic representation of the gas streams in the ring sector of FIG. 2. In the middle zone I, the central radial stream $FI_0$ comes from the central perforation 14*c*. Each of the two axial streams $fI_0$ coming from the central radial stream $FI_0$ is oriented towards a respective side C of the ring sector 16. In other words, the axial streams $fI_0$ coming from the central radial stream $FI_0$ are oriented towards the lateral zones II and III. From the central perforation 14*c*, with the gap E increasing in both axial directions (i.e. towards the lateral zones II and III), the axial streams $fI_0$ are subjected to suction, thus having the effect of slowing down on their flow speeds. Thus, these axial streams $fI_0$ do not shear the radial streams $FI_1$ adjacent to the radial stream $FI_0$ coming from the perforations 14 adjacent to the central perforation 14*c*.

The axial stream $fI_1$ coming from the radial stream $FI_1$ located on the same side of the central perforation 14*c* as the lateral zone II flows towards the lateral zone II, while the axial stream $fI_1$ coming from the radial stream $FI_1$ located on the same side of the central perforation 14*c* as the lateral zone III flows towards the lateral zone III. Since the gap E increases going towards the lateral zones II and III, the axial streams coming from the radial streams located on the same sides of the central perforation 14*c* as these lateral zones II and III flow preferentially towards these lateral zones II and III. Furthermore, since the gap E increases along the flow directions of the axial streams $fI_1$, these streams are subjected to suction that reduces their flow speeds, thus avoiding them shearing the adjacent radial streams $FII_0$ and $FIII_0$. In the same manner as the axial streams $fI_0$ and $fI_1$, the axial streams $fII_0$ and $fIII_0$ are subjected to suction that reduces their flow speeds. Thus, the axial stream $fIII_0$ does not shear the adjacent radial stream $FIII_1$, and so on for the other axial and radial streams in the lateral zone III. In a variant presenting a plurality of perforations 14 in the axial direction in the lateral zone II, this suction effect naturally occurs, and the successive radial streams are not sheared by the axial streams.

Furthermore, in order to simplify the description, it is stated above that the axial streams fn come from the radial streams Fn, but it should readily be understood that the streams fn are in reality the result of summing the streams f0, f1, . . . , fn−1 and the axial stream coming from the radial stream Fn.

Furthermore, since the gap E is smaller in the middle zone I than in the lateral zones II and III, the cooling of the wall 15 in register with the middle zone I is performed essentially by impact, whereas the cooling of the wall 15 in register with the lateral zones II and III is performed essentially by convection. Since the gap E is at a minimum in the middle zone I, it is in this zone that cooling by impact is the most efficient. Furthermore, since the gap E in the lateral zones II and III is larger than in the middle zone I, the speeds of the axial streams in these zones are smaller than in the middle zone I, so that convection cooling is more efficient. Naturally, the radial streams in the lateral zones II and III contribute actively to cooling the wall 15 (by impact), even though the perforations 14 from which they come are further away from the wall 15 than in the middle zone I. Furthermore, because of the way the profile of the gap E varies in accordance with the invention, the radial streams in the lateral zones II and III are sheared little or not at all by the axial streams, even if the axial streams are large, so their cooling effect remains efficient. Thus, depending on the values selected for the profile with which the gap varies in accordance with the invention, the flow speeds of the various streams (i.e. of the axial and radial streams) are adjusted, thereby controlling the efficiency of impact cooling and of convective cooling. Consequently, the overall cooling of the wall 15 is uniform, i.e. the wall 15 is maintained at a temperature that is uniform over the entire ring sector 16.

Figure 3:
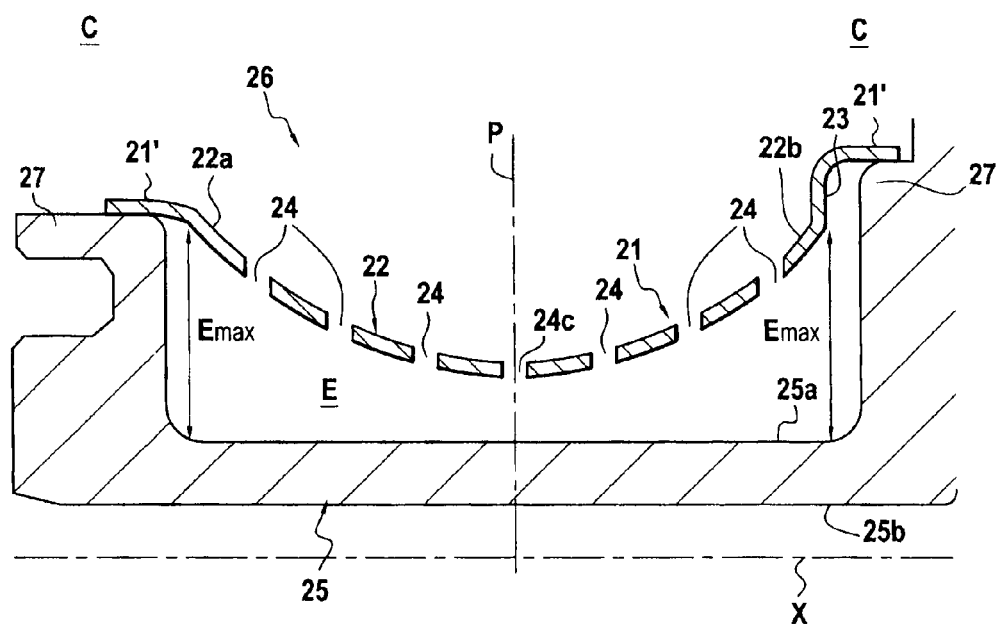
FIG. 3 is an axial section view of a second embodiment of a ring sector of the invention.

FIG. 3 shows a second embodiment of the invention. This second embodiment is similar to the first except for the following points. It should be observed that elements in common with the first embodiment are not described again, with their reference numbers being increased by 10 relative to the first embodiment.

Thus, in this ring sector 26, the minimum of the gap is located in the middle along the axial direction of the bottom of the multiply-perforated metal sheet 22 and of the wall 25. In a variant, the minimum of the gap is located in the middle, along the axial direction, of the bottom of the multiply-perforated metal sheet 22 or of the wall 25.

Furthermore, the maximum values Emax of the gap E at the axial ends 22*a* and 22*b* of the bottom 22 are equal. Thus, compared with the first embodiment 16, this amounts to saying that the first maximum Emax1 is substantially equal to the second maximum Emax2. In this example, the minimum value of the gap Emin lies in the range 0.8 mm to 1.2 mm, and is preferably equal to about 1.0 mm. Furthermore, the maximum value of the gap Emax lies in the range 1.6 mm to 2.4 mm, and is preferably equal to about 2.0 mm. It should be observed that when the maximum gap values Emax1 and Emax2 are different, they also lie in the embodiment of FIGS. 2A and 2B in the range 1.6 mm to the 2.4 mm In the embodiment of FIG. 3, in order to compensate for a height difference between the two edges 27 of the ring sector 26, the bottom 22 of the multiply-perforated metal sheet 21 is connected to a side wall 23 beside the axial end 22*b*, said side wall 23 itself being connected to a tab 21', while the end 22*a* of the bottom is directly connected to the tab 21'.

More generally, the bottom 22 of the multiply-perforated metal sheet 21 is substantially symmetrical about the radial plane P passing through the minimum of the gap. The distribution of the perforations 24 also presents such symmetry. This makes it possible to simplify fabrication of the multiply-perforated metal sheet, and thus to reduce fabrication costs.

What is claimed is:

1. A turbine ring sector comprising:
   a wall presenting an inside face and an outside face, the inside face defining an axially oriented airflow passage through which gas flows; and
   a multiply-perforated metal sheet situated on a side of the wall that is opposite from the airflow passage, said multiply-perforated metal sheet having a bottom,
   wherein, in an axial cross section, the outside face of the wall is planar and the bottom of the multiply-perforated metal sheet presents an arcuate convex shape extending toward an axis of the turbine ring sector,
   wherein a minimum radial distance between the outside face of the wall and the bottom of the multiply-perforated metal sheet defines a gap, and
   wherein a variation in a value of the gap over an entire axial or circumferential extent thereof gradually decreases from a first maximum value at a first end of the multiply-perforated metal sheet towards a minimum value, said minimum value defining a minimum of the gap, and gradually increases from the minimum value to a second maximum value at a second end of the multiply-perforated metal sheet.

2. The ring sector according to claim 1, wherein the minimum of the gap is placed in register with a hot zone of the wall.

3. The ring sector according to claim 1, wherein the minimum of the gap is placed, along the axial direction, in a middle of at least one of the bottom of the multiply-perforated metal sheet or the wall.

4. The ring sector according to claim 1, wherein the first maximum value is substantially equal to the second maximum value.

5. The ring sector according to claim 1, wherein the multiply-perforated metal sheet presents at least one perforation at the minimum of the gap.

6. The ring sector according to claim 1, wherein a middle zone extends around the minimum of the gap, the multiply-perforated metal sheet presenting more perforations in the middle zone than in the zones located on either side of the middle zone.

7. The ring sector according to claim 1, wherein the bottom of the multiply-perforated metal sheet is substantially symmetrical about a radial plane passing through the minimum of the gap.

8. The ring sector according to claim 1, wherein the bottom of the multiply-perforated metal sheet is connected to fastener tabs which fasten the multiply-perforated metal sheet to rims of the wall.

9. A turbine ring including at least one ring sector according to claim 1.

10. A turbine including a ring according to claim 9.

11. A turbomachine including a turbine according to claim 10.

* * * * *